United States Patent [19]
Overton

[11] Patent Number: 5,838,838
[45] Date of Patent: Nov. 17, 1998

[54] DOWN-SCALING TECHNIQUE FOR BI-LEVEL IMAGES

[75] Inventor: Mark A. Overton, Escondido, Calif.

[73] Assignee: Hewlett-Packard Company, Palo Alto, Calif.

[21] Appl. No.: 694,711

[22] Filed: Jul. 19, 1996

[51] Int. Cl.⁶ .................................................. G06K 9/46
[52] U.S. Cl. .......................................... 382/298; 382/299
[58] Field of Search .................................... 358/448, 449, 358/451, 462, 464, 528; 382/298–301, 176, 258

[56] References Cited

U.S. PATENT DOCUMENTS

| | | | |
|---|---|---|---|
| 3,710,323 | 1/1973 | Andrews et al. | 382/298 |
| 4,075,663 | 2/1978 | Wellendorf | 358/283 |
| 4,345,314 | 8/1982 | Melamud et al. | 364/515 |
| 4,364,024 | 12/1982 | Paetsch | 340/146.3 SY |
| 4,394,693 | 7/1983 | Shirley | 358/298 |
| 4,517,604 | 5/1985 | Lasher et al. | 358/262 |
| 4,532,651 | 7/1985 | Pennebaker, Jr. et al. | 382/54 |
| 4,573,200 | 2/1986 | Bednar et al. | 382/298 |
| 4,599,656 | 7/1986 | Bellinghausen | 358/261 |
| 4,614,977 | 9/1986 | Kawahara et al. | 358/260 |
| 4,740,828 | 4/1988 | Kinoshita | 358/48 |
| 4,783,838 | 11/1988 | Matsunawa | 382/51 |
| 4,807,046 | 2/1989 | Nakatani | 358/287 |
| 4,872,064 | 10/1989 | Tutt et al. | 358/464 |
| 4,881,069 | 11/1989 | Kameda et al. | 382/299 |
| 4,924,522 | 5/1990 | Bray et al. | 382/299 |
| 4,930,021 | 5/1990 | Okada | 358/451 |
| 4,935,822 | 6/1990 | Kubota | 358/451 |
| 4,975,785 | 12/1990 | Kantor | 353/447 |
| 5,016,118 | 5/1991 | Nannichi | 358/462 |
| 5,029,017 | 7/1991 | Abe et al. | 358/451 |
| 5,050,225 | 9/1991 | Itoh | 382/46 |
| 5,121,222 | 6/1992 | Endoh et al. | 358/451 |
| 5,148,295 | 9/1992 | Matsubara | 358/451 |
| 5,267,052 | 11/1993 | Bannai et al. | 358/444 |
| 5,289,292 | 2/1994 | Osasa et al. | 358/451 |
| 5,347,596 | 9/1994 | Dominguez, Jr. et al. | 358/451 |
| 5,351,137 | 9/1994 | Kato et al. | 358/457 |
| 5,412,486 | 5/1995 | Bannai et al. | 358/444 |
| 5,477,397 | 12/1995 | Naimpally et al. | 360/10.3 |
| 5,488,486 | 1/1996 | Shimizu | 358/451 |

*Primary Examiner*—David K. Moore
*Assistant Examiner*—Stephen Brinich

[57] ABSTRACT

In a preferred method for horizontal down-scaling of a pixel pattern, the down-scaling is performed on a byte-by-byte basis along each row of pixels. To avoid loss of pixels, if a pixel to be deleted is black and the black pixel has two original white immediate neighbors, the pixel to the right of the black pixel to be deleted is set to black. Each byte may be processed independently from the other bytes. In a preferred method for vertical down-scaling of a pixel pattern, a pixel row to be deleted, to achieve the desired down-scaling, is identified. To avoid loss of information, pixels in a byte of pixels in the row to be deleted are bit-wise logically OR'd with the corresponding pixels in the next row, and the OR'd values replace the pixels in that next row. Changing the pixel values during the horizontal or vertical down-scaling is only performed if it is determined that the byte is part of text and not part of a picture. In the preferred embodiment circuit, look-up tables are used which receive the original bytes as addresses and output the horizontally down-scaled pixels. A look-up table may also determine if the byte is part of text or part of a picture. The total memory capacity required for the circuit is small compared to the prior art, and the processing is fast.

22 Claims, 6 Drawing Sheets

DOWN-SCALING TECHNIQUE FOR BI-LEVEL IMAGES

FIELD OF THE INVENTION

The present invention generally relates to image processing and, more particularly, to methods and apparatuses for down-scaling bi-level images.

BACKGROUND OF THE INVENTION

Bi-level images are two-dimensional patterns formed by pixels, in which each pixel is in one of two states. Electronically, the two states are represented by a binary 1 or a binary 0. These two-dimensional patterns are displayed by, for example, facsimile machines, monochrome computer displays, and dot printers. It will be assumed for this disclosure that a binary 1 represents a black pixel (or the presence of a dot) and a binary 0 represents a white pixel (or the absence of a dot). However, in practice, the binary 1 and 0 can be used to represent any two display states.

Both text and pictures can be represented by black and white pixels. By controlling the density of black pixels, shades of gray are created to form halftone images.

In situations where the resolution (pixel density) of an original image is greater than the resolution of the display device, or where the original image size is too large to be completely displayed by the display device, down-scaling of the bi-level image may be performed in the horizontal and/or vertical directions to reduce the resolution and size of the displayed image. A variety of prior art methods have been developed to down-scale bi-level images.

One method simply deletes pixels from the original pattern without modifying the remaining pixels, regardless of whether the pixels to be deleted contain important data that will not be adequately represented by the remaining pixels. Other methods of reducing the image size attempt to avoid obliterating important data.

U.S. Pat. No. 5,351,137 to Kato, incorporated herein by reference, describes "logical OR'ing" in which, if a two-dimensional block of pixels (e.g., a 2×2 block for a 4-to-1 reduction) contains at least one black pixel, the pixels in the block are replaced by one black pixel. If the block contains no black pixels, the pixels are replaced with one white pixel. The image is reduced block by block.

Kato also teaches the "majority" method in which a two-dimensional block is reduced to a single black pixel if the block contains a majority of black pixels; otherwise, the block is reduced to a white pixel.

The general methods described by Kato require the formation of variable two-dimensional blocks, and the memory and processing circuitry must be designed for worst case conditions. This results in large memory requirements.

Another method, described in U.S. Pat. No. 5,289,292 to Osada, incorporated herein by reference, performs horizontal and vertical scaling separately. Osada discloses using a complex combination of low-pass filtering and weighted averaging to reduce size while attempting to minimize the loss of important data. This method requires relatively complex circuitry, which adds significant cost to the display device.

U.S. Pat. No. 5,016,118 to Nannichi, incorporated herein by reference, describes a method for determining whether a group of pixels is part of text or part of a picture so that the pixels may then be processed in the appropriate manner. Nannichi teaches that a pixel block is part of a picture if the longest run length (horizontally or vertically) in the block (e.g., 4×4 pixels) is shorter than a predetermined length (e.g., two pixels or less) and the number of black runs in the block is higher than a predetermined value (e.g., three or more). If the block meets the above criterion, the block is determined to be part of a picture. Consequently, Nannichi must buffer four complete lines of pixels (for a 4×4 block) for comparison of the pixels within each block. This adds delay and storage size for the display device.

What is needed is an inexpensive and fast technique for down-scaling a bi-level image determined to be text using minimal buffer memory while minimizing the loss of important data.

SUMMARY

In a preferred method for horizontal down-scaling of a pixel pattern, the down-scaling is performed on a byte-by-byte basis along each row of pixels. For each byte in a string of original pixel values, the predetermined pixel locations to be deleted from the byte to achieve the desired horizontal down-scaling are first identified. For a ½ scaling factor, every other pixel location will be deleted. To avoid loss of information, if a pixel to be deleted is black and the black pixel has two original white immediate neighbors, the pixel to the right of the black pixel to be deleted is set to black. Pixels immediately to the right and left of the byte are assumed to be white, so each byte may be processed independently from the other bytes. In another embodiment, the pixel to the left (rather than the right) of the black pixel to be deleted is made black.

The resulting pixels in the pixel locations which are to be retained are then displayed or buffered for further processing.

In a preferred method for vertical down-scaling of a pixel pattern, a pixel row to be deleted, to achieve the desired down-scaling, is identified. To avoid loss of information, the pixels in the row to be deleted are bit-wise logically OR'd with the corresponding pixels in the next row, and the OR'd values replace the pixels in that next row.

In the preferred embodiment, changing the pixel values during the horizontal down-scaling is only performed if it is determined that the byte is part of text and not part of a picture. A byte is assumed to be part of text if it contains a maximum of two black runs, where a run is a group of one or more consecutive black pixels bounded by white pixels. The pixels immediately to the right and left of the byte are assumed to be white. If the byte is determined to be part of a picture, then the pixels designated to be deleted are simply deleted without affecting the other pixels.

Also in the preferred embodiment, the logical ORing for the vertical scaling is only performed if it is determined that the byte containing the pixels to be deleted is part of text and not part of a picture. A byte is deemed to be part of text, for the vertical scaling, if it contains exactly one black run (one or more black pixels bounded by white pixels) or exactly one white run. Pixels immediately to the right and left of the byte are assumed to be white. If the byte is determined to be part of a picture, the pixel row is simply deleted without affecting the other pixel rows.

If both horizontal and vertical down-scaling are desired, in the preferred embodiment, the vertical down-scaling is performed first, and the horizontal down-scaling is performed on the vertically scaled pixel pattern. This reduces the number of bytes needed to be horizontally scaled.

A circuit for down-scaling a bi-level image comprises a memory for storing at least one row of pixels and a logic circuit for performing the logical operations on the pixels and for determining whether a byte is part of text or part of a picture. In another embodiment, instead of a logic circuit, look-up tables are used which receive the original bytes as addresses and output the down-scaled pixels. A look-up table may also determine if the byte is part of text or part of a picture.

The total memory capacity required for the circuit is small compared to the prior art, and the processing is fast.

BEST MODE FOR PRACTICING THE INVENTION

Figure 1:
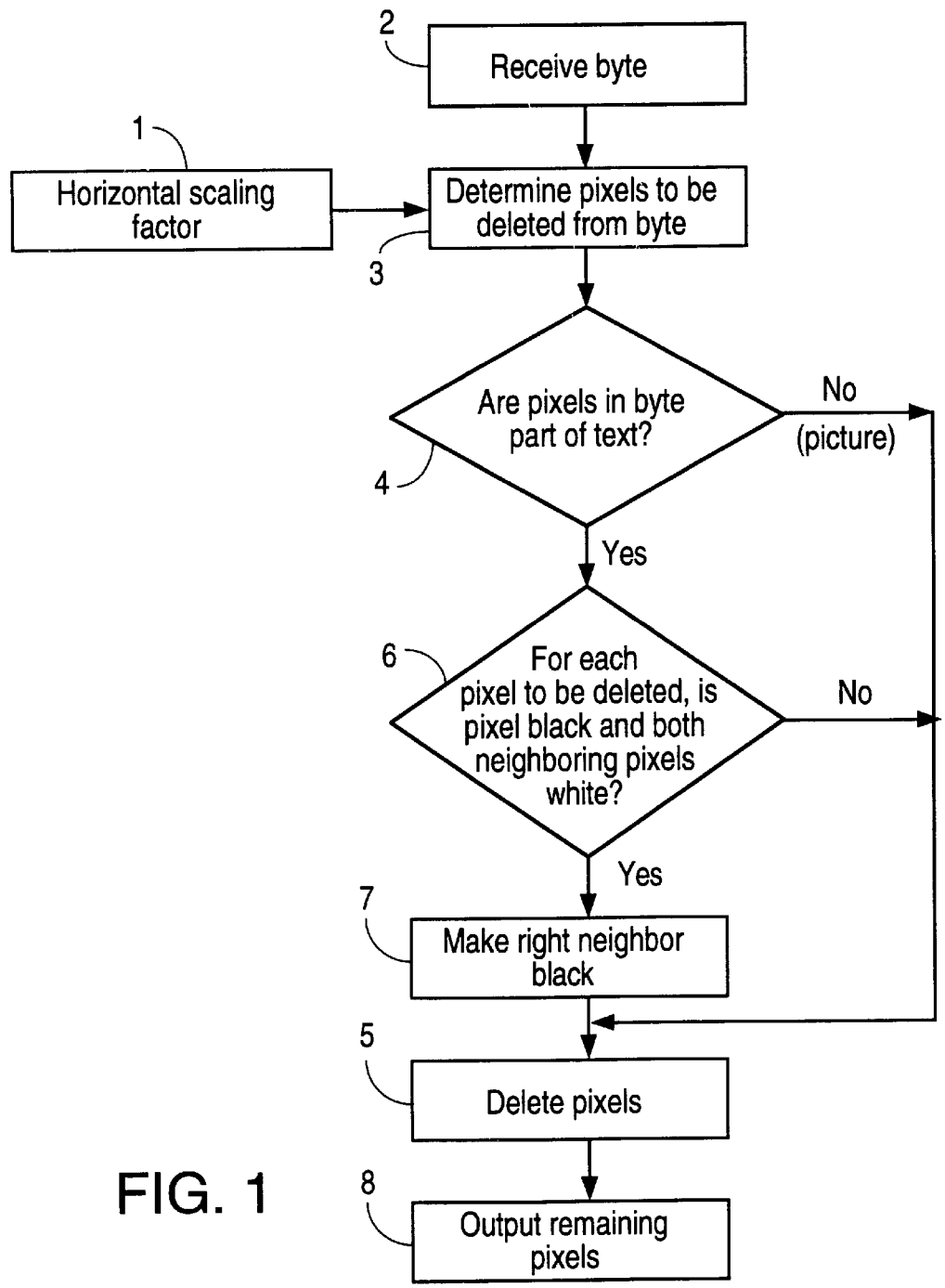
FIG. 1 is a flow chart of a preferred method for horizontal down-scaling of a byte of pixel information.

FIG. 1 is a flow chart of a method for horizontal down-scaling of a two-dimensional pixel pattern according to the preferred embodiment of the invention.

In Step 1, the horizontal scaling factor is selected automatically or manually.

In Step 2, an original byte containing eight pixel values in a row of pixels is received.

In Step 3, it is determined which pixel locations are to be deleted from the byte to achieve the designated horizontal scaling. This step spaces out the deleted pixels in a row to the maximum extent. For example, with a scaling factor of ½, every other pixel location in the byte will be deleted. With a scaling factor of 15/16, the average number of final pixels in a byte will be 7.5, with some bytes having one pixel deleted and other bytes having no pixels deleted.

In Step 4, it is determined if the pixels in the original byte have characteristics which would indicate that the original byte represents part of text. If not, the original byte is determined to part of a picture, and Step 5 simply deletes the pixels in the designated pixel locations to achieve the desired horizontal scaling.

If the original byte is determined to part of text, Step 6 determines, for each original pixel to be deleted, whether the pixel to be deleted is black and both its neighboring pixels are white. The pixels immediately to the right and left of the byte are assumed to be white even if, in actuality, they are not. If the criterion is not met, the pixel is simply deleted in Step 5. On the other hand, if the criterion is met, the pixel within the same byte immediately to the right (as seen horizontally across a row of pixels) of the black pixel to be deleted is forced to be black in Step 7. The black pixel to be deleted is then deleted in Step 5 to achieve the desired horizontal scaling. In another embodiment, Step 7 forces the left neighbor to be black instead of the right neighbor.

In Step 8, the remaining pixels are outputted as the scaled down pixel pattern.

Using this process, each byte is processed independently from the other bytes, and the processing circuitry can be simply implemented.

Figure 2:
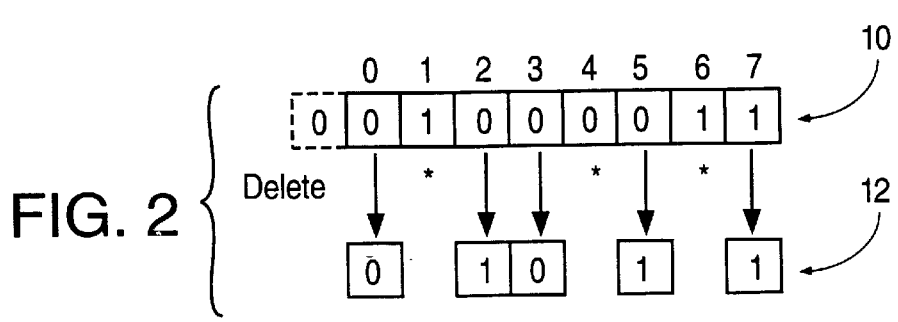
FIG. 2, illustrates the horizontal down-scaling method of FIG. 1 being performed on a sample byte.

FIG. 2 is an example of the horizontal down-scaling process of FIG. 1 when the original byte is determined to be text and the scaling factor is ⅝. The original byte 10 contains bits (1 for black and 0 for white) labelled from left to right 0 through 7. An asterisk appears under each pixel which has been determined to be deleted in Step 3 of FIG. 1 to achieve the scaling factor of ⅝. In the preferred embodiment, the pixels to be deleted are as evenly spaced as feasible along the row to best represent the data in the row. An assumed pixel value of 0 in an adjacent byte is illustrated in dashed outline. The final output pixels 12 for the sample byte are shown. As seen in FIG. 2, one original pixel value has been changed by undergoing the Steps 6 and 7 in FIG. 1.

In one implementation of a circuit for carrying out the process of FIG. 1, a processor carrying out a stored program controls a logic circuit for performing the various operations. The logic circuit may also be controlled by a state machine. In a preferred embodiment, however, the process of FIG. 1 is carried out by programming one or more look-up tables to contain the desired output pixels in address locations corresponding to the original byte values. Additional detail of this embodiment is described later with respect to FIGS. 10 and 11.

Figure 3:
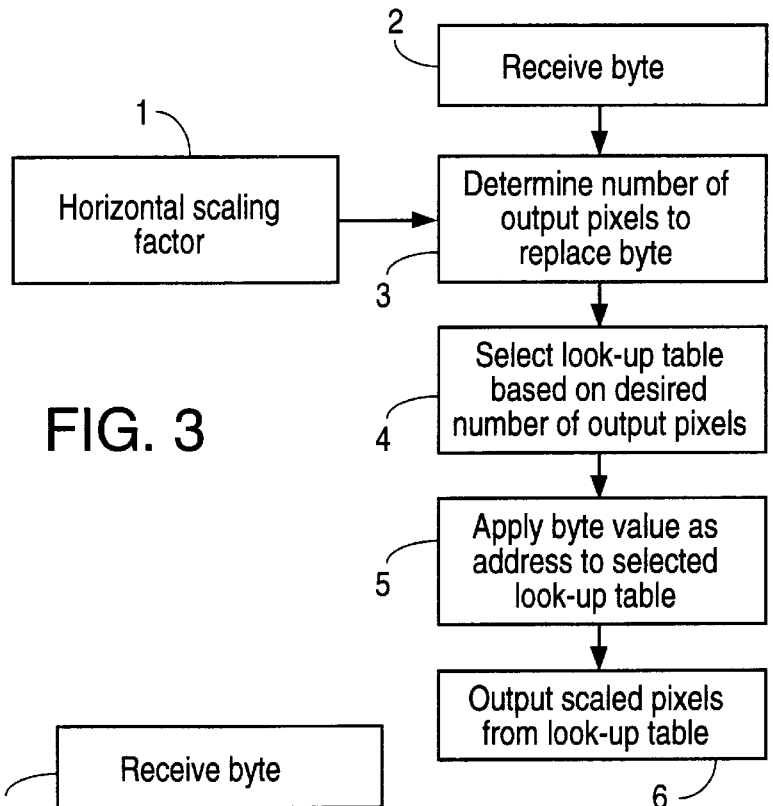
FIG. 3 is a flow chart of a preferred embodiment for carrying out Step 6 in FIG. 1 using look-up tables.

FIG. 3 is a flow chart of the down-scaling method of FIG. 1 as carried out using look-up tables which are initially programmed for each original pixel combination in a byte using the steps shown in FIG. 1. The corresponding output pixels stored in the look-up tables would normally be generated using a software program performing the logical functions shown in FIG. 1.

In Step 1 of FIG. 3, a horizontal scaling factor is selected either automatically or manually.

In Step 2, an original byte to be down-scaled is received.

Figure 11:
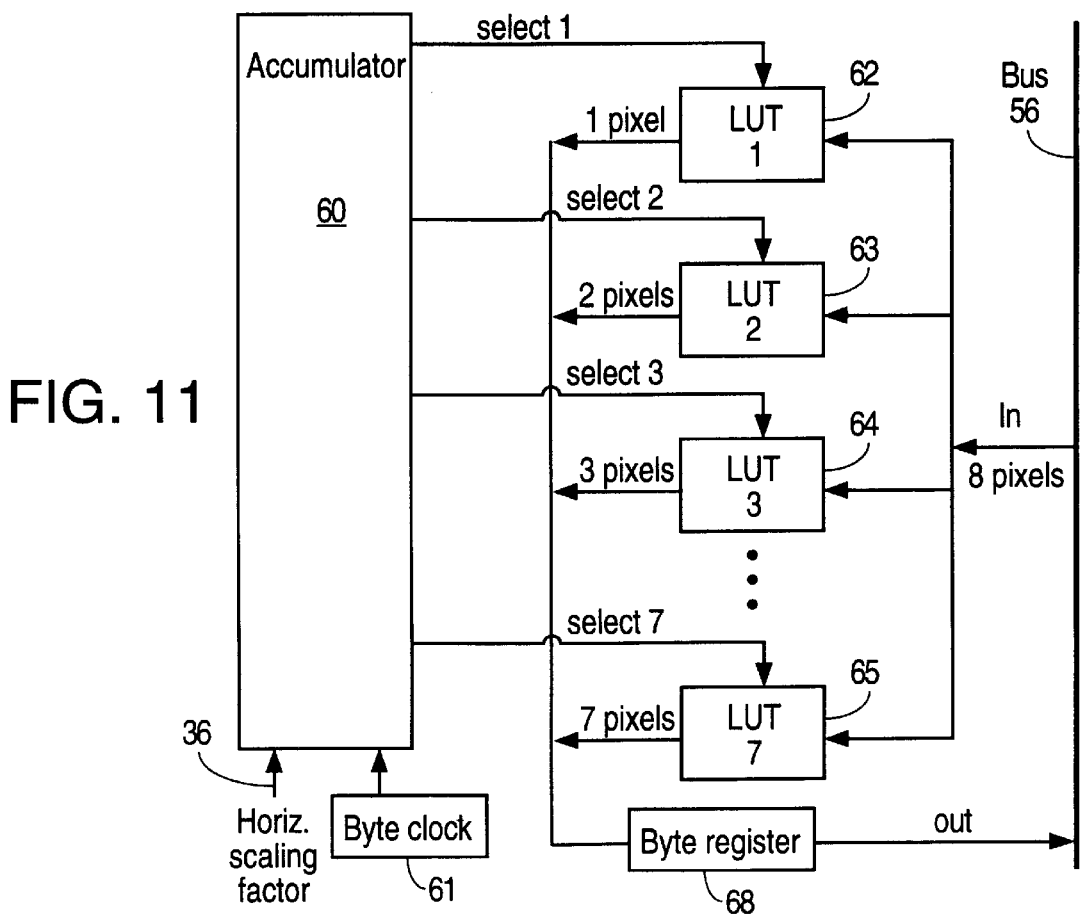
FIG. 11 is a block diagram of one embodiment of the byte reduction unit 46 in FIG. 10.

In Step 3, the desired number of output pixels to replace the original byte, based on the horizontal scaling factor, is determined. In the preferred embodiment, an accumulator, to be described with respect to FIG. 11, is used to designate the number of output pixels to be generated for a particular byte. The accumulator multiplies the scale factor by 8, for determining the average number of bits per scaled byte, and maintains a fractional part. The integer part is the number of desired output bits to be produced by the next input byte.

In Step 4, one of a plurality of look-up tables (e.g., seven), one table for each number of output pixels to be generated, is selected based on the desired number of output pixels.

In Step 5, the original byte is then applied as an address to the selected look-up table.

In Step 6, the selected look-up table then outputs the desired number of pixels from the addressed location for display or for further processing.

Figure 4:
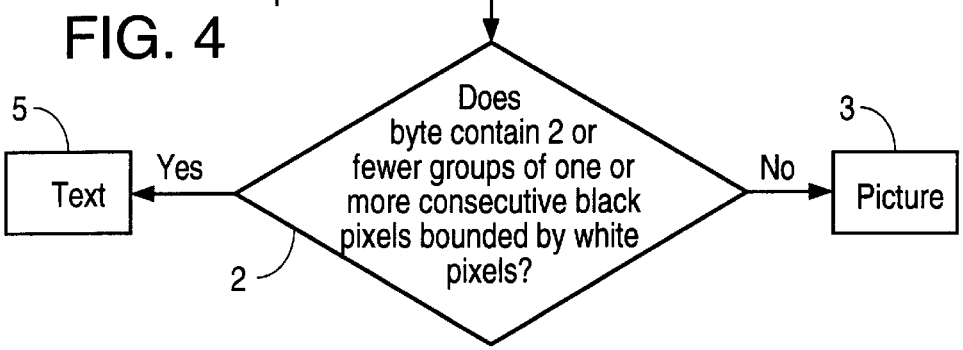
FIG. 4 is a flow chart of a preferred embodiment for carrying out Step 4 in FIG. 1, which determines whether the pixels in a byte form part of text or part of a picture.

FIG. 4 is a flow chart of one embodiment of Step 4 of FIG. 1, which is the preferred method for determining whether the pixels in an original byte form part of text or part of a picture for purposes of horizontal scaling.

In Step 1 of FIG. 4, the original byte is received.

In Step 2, it is determined if the original byte contains two or fewer groups of one or more consecutive black pixels, bounded by white pixels. If not, it is assumed that the original byte is part of a picture (Step 3). If the criterion in Step 2 is met, it is assumed that the original byte is part of text (Step 4). In order for each byte to be independently processed, it is assumed that the pixel immediately to the right and left of the byte is white. Step 4 in FIG. 4 then proceeds to Step 6 of FIG. 1, and Step 3 of FIG. 4 proceeds to Step 5 of FIG. 1.

Figure 5:
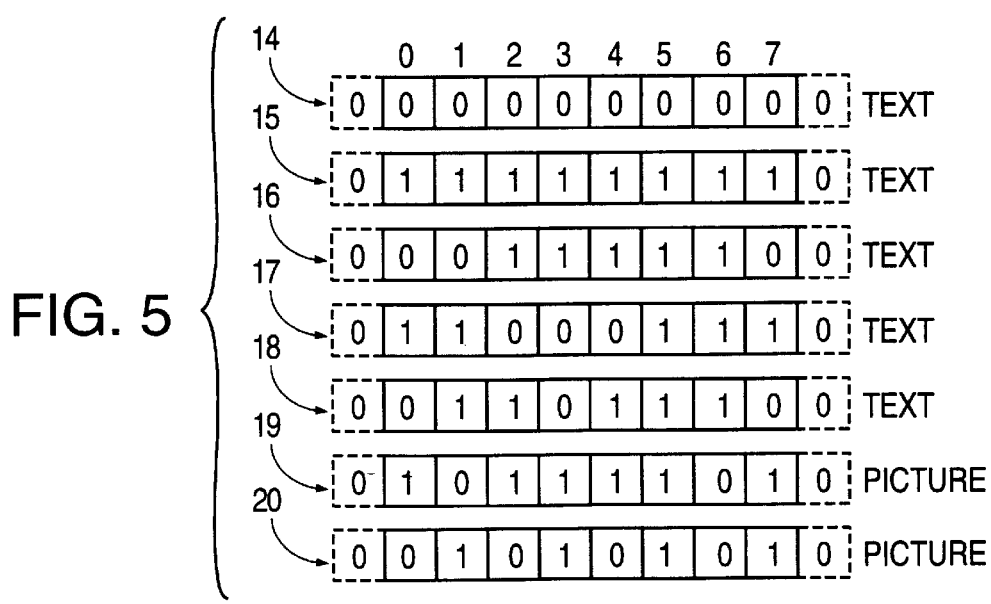
FIG. 5 illustrates sample bytes designated as text or picture using the method of FIG. 4.

FIG. 5 is a diagram of sample bytes 14 through 20 designated as text or picture as a result of Step 2 of FIG. 4 to illustrate the process of FIG. 4. The assumed values of pixels to the right and left of the byte are shown in dashed outline. As seen, only in bytes 14–18 are there two or fewer runs of black pixels bounded by white pixels, indicating that the bytes contain part of text. The pixel patterns in bytes 19 and 20 are consistent with a halftone image since text is not likely to have such narrow black or white widths.

Figure 6:
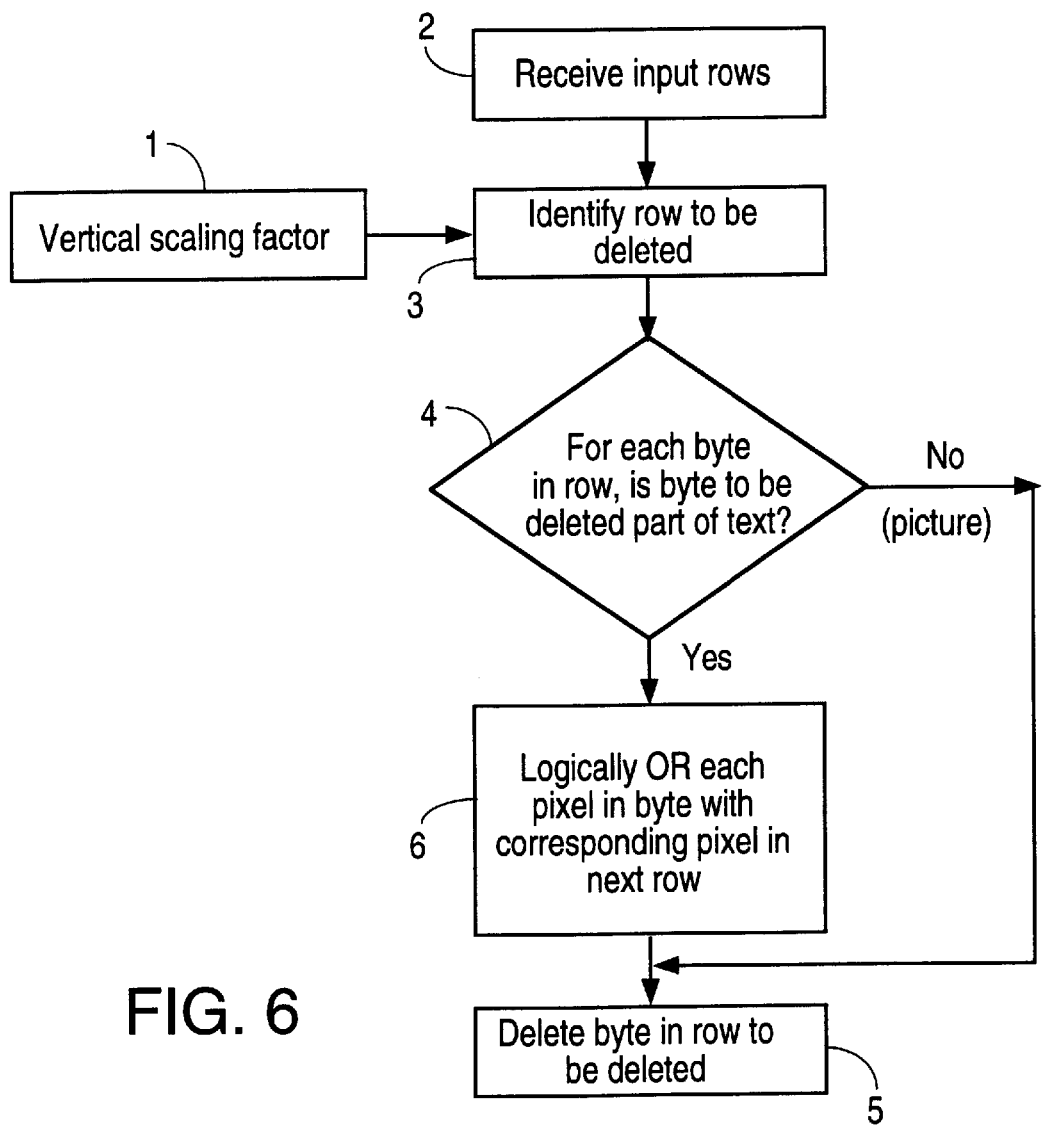
FIG. 6 is a flow chart of a preferred method for vertical down-scaling a pixel pattern.

FIG. 6 is a flow chart of a method for vertical down-scaling according to a preferred embodiment of the present invention.

In Step 1 of FIG. 6, a vertical scaling factor is selected either automatically or manually.

In Step 2, the input rows of pixel (or signals representing these pixels) are being received, such as from a remote facsimile machine.

In Step 3, a received row is determined to be retained or deleted based on the vertical scaling factor. The deleted rows are to be spread out as evenly as possible along the image to achieve the desired vertical scaling. This may be achieved using an accumulator.

In Step 4, for each byte in the to-be-deleted row, it is determined whether the byte is part of text or part of a picture. If a byte is determined to be part of a picture, the byte is simply deleted in Step 5.

If the byte is determined to be part of text, then, in Step 6, the pixels in that byte are bit-wise logically OR'd into the corresponding pixels in the next row, which is a row assumed not to be deleted. Since the techniques described herein, in one embodiment, are incorporated into a facsimile machine with an automatic image size adjustment, the scaling factor will typically not be less than ½. Therefore, the row after any deleted row will usually be retained.

The bytes in the row to be deleted are then deleted in Step 5.

In an alternative embodiment, the bytes in the row to be retained are determined to be part of text or part of a picture, and the decision to logically OR the pixels is based on whether either the to-be-deleted byte or the to-be-retained byte is part of text. The decision to merge the pixels may also be based on whether both the bytes meet the criterion for text. Alternatively, the decision to merge the pixels may be based on whether any neighboring bytes meet the criterion for text.

Figure 7:
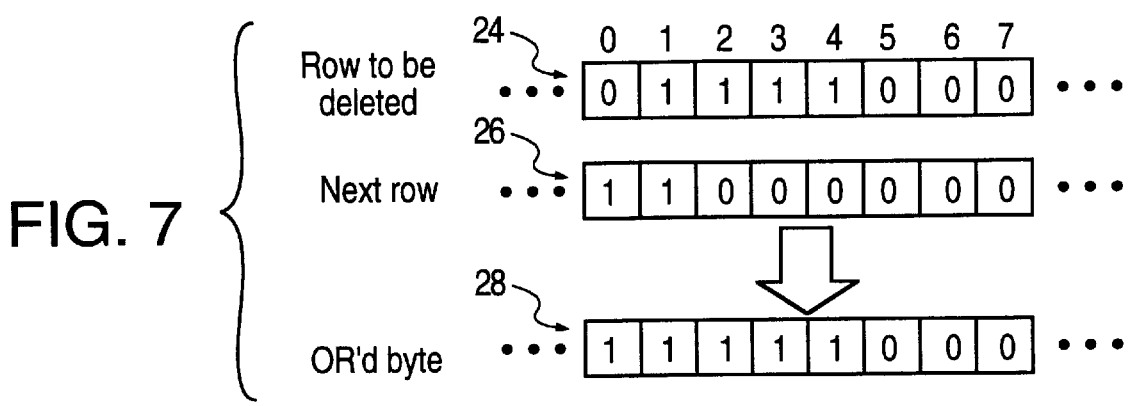
FIG. 7 illustrates the vertical down-scaling method of FIG. 6 performed on sample bytes.

FIG. 7 is an example of the vertical down-scaling of FIG. 6. The byte 24 in the row to be deleted and the corresponding byte 26 in the next row to be retained are shown. The byte 24 in the row to be deleted has been previously designated as text. Therefore, the byte 24 in the row to be deleted and the corresponding byte 26 in the next row are logically OR'ed in Step 6 of FIG. 6 to generate the resulting byte 28. The resulting byte 28 then replaces the corresponding byte 26 in the row to be retained. Using this vertical scaling process, the loss of information is minimized when deleting rows containing text.

The process shown in FIG. 7 can be performed using only a single line buffer which stores a row to be deleted. As the bytes for the next row are received, the corresponding bytes in the adjacent rows are logically OR'd, if appropriate, and transferred for further processing. Once the OR'ing process for the entire row is completed, the next row to be deleted is stored in the buffer.

Figure 8:
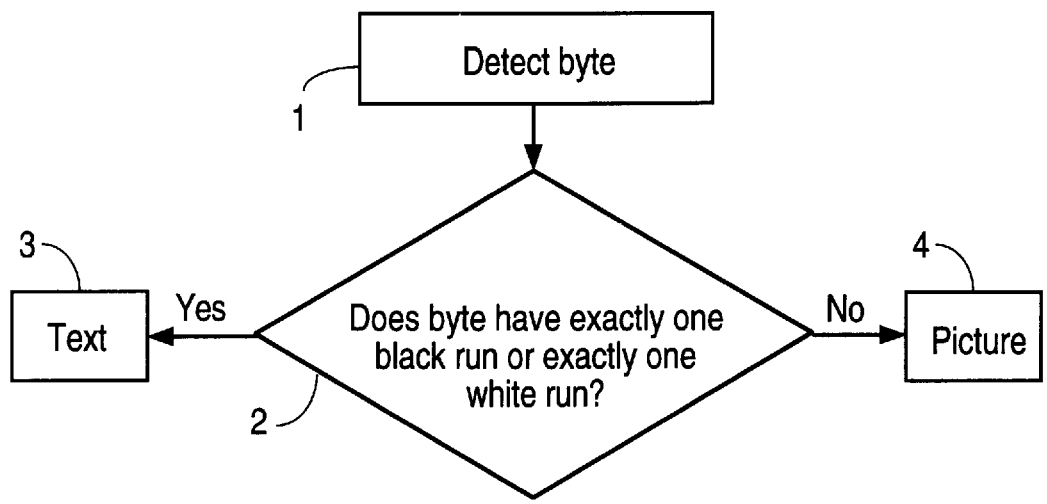
FIG. 8 is a flow chart of the preferred method of Step 4 in FIG. 6 for determining whether the pixels in a byte form part of text or part of a picture.

FIG. 8 is a flow chart of a preferred method of Step 4 of FIG. 6 for determining whether the pixels in a byte of a row to be deleted form part of text or part of a picture.

In Step 1 of FIG. 8, a byte in the row to be deleted is detected.

In Step 2, it is determined whether the byte has exactly one black run or exactly one white run, a black run being a group of one or more consecutive black pixels bounded by white pixels, and a white run being a group of one or more consecutive white pixels bounded by black pixels. The pixels immediately to the right and left of the byte are assumed to be white pixels.

If it is determined that there is exactly one black run or one white run, then it is assumed the byte is part of text (Step 3), and the OR'ing process described in FIG. 6 is carried out. If the criterion for text is not met, it is assumed the byte is part of a picture (Step 4), and the byte is simply deleted without affecting any other pixels.

Figure 9:
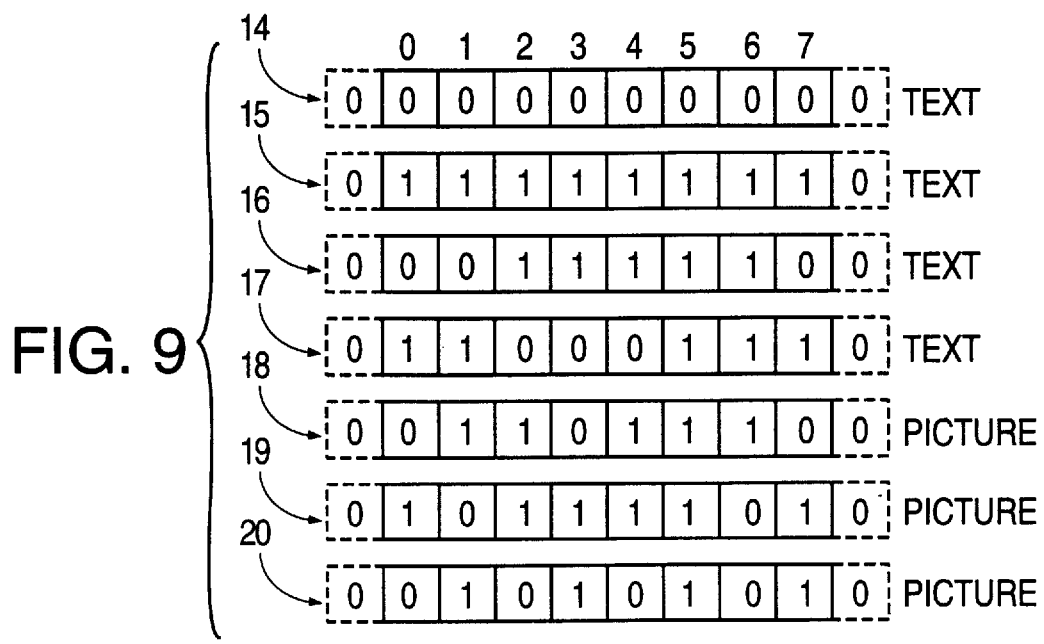
FIG. 9 illustrates sample bytes designated as text or picture using the method of FIG. 8.

FIG. 9 is a diagram of sample bytes 14 through 20, identical to those bytes in FIG. 5, for illustrating the text/picture determining method of FIG. 8. The assumed pixel values to the right and left of the byte are shown in dashed outline. As seen, only in bytes 14–17 is there exactly one black run or exactly one white run, and, therefore, bytes 14–17 are assumed to be part of text.

In the preferred embodiment, if both horizontal and vertical scaling are required, the vertical scaling is performed first, and the horizontal scaling method is performed on the vertically scaled bytes. This reduces the number of bytes which must be processed during the horizontal scaling process.

Figure 10:
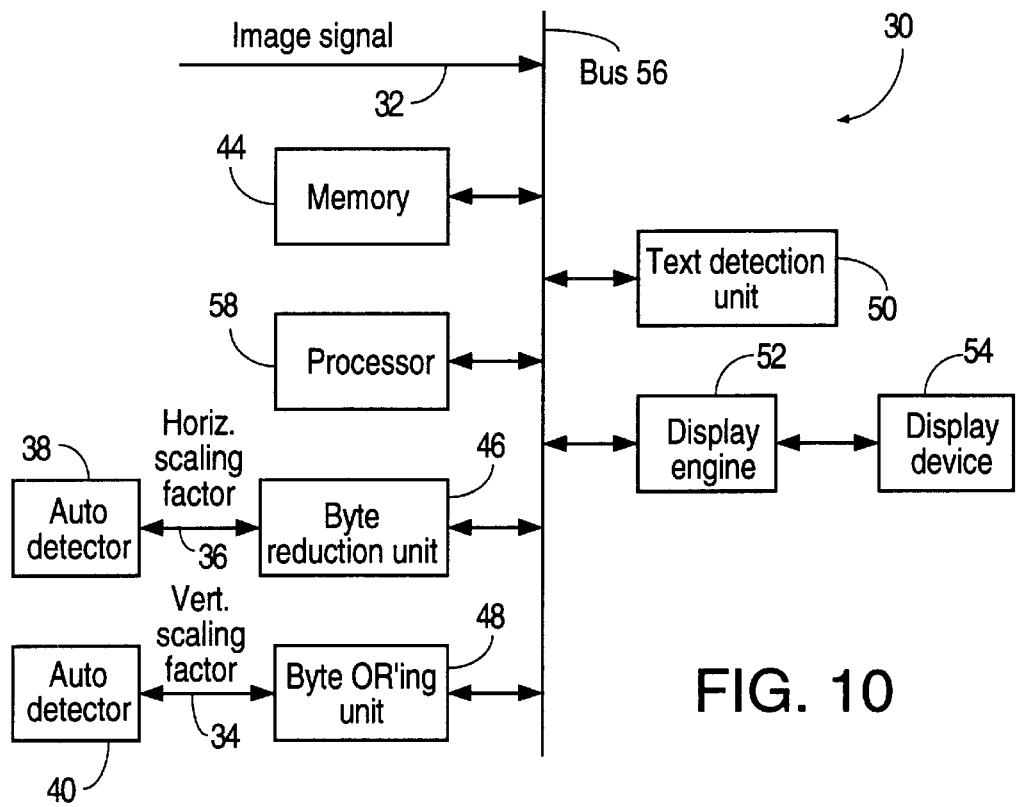
FIG. 10 is a block diagram of a circuit which carries out the methods of FIG. 1 and FIG. 6.

FIG. 10 is a block diagram of a circuit 30 which carries out the methods of FIG. 1 and FIG. 6. Circuit 30 receives the image signal 32 containing the bytes of original pixels, the vertical scaling factor 34, and the horizontal scaling factor 36. Automatic detectors 38 and 40 for the horizontal and vertical scaling factors may be used by the display device to automatically determine when a reduction in scale is required, such as when the original resolution (pixel density) cannot be supported by the display device or when the original image is too large to be completely displayed by the display device.

Circuit 30 also includes a buffer memory 44 for storing data as needed, a byte reduction unit 46 for horizontal scaling, a byte OR'ing unit 48 for vertical scaling, a text detection unit 50, a display engine 52 (for formatting, timing, etc.) connected to a display device 54, a byte-wide bus 56, and a processor 58 for controlling the overall operation of the circuitry.

Byte reduction unit 46 and text detection unit 50 contain circuitry to carry out the method of FIG. 1, while byte OR'ing unit 48 and text detection unit 50 contain circuitry to carry out the method of FIG. 6. The resulting down-scaled bytes may then be buffered in memory 44, if necessary, and transferred to the display engine 52 for conversion into the proper format for the display device 54. Display device 54 may be a dot printer or a monitor.

FIG. 11 is a block diagram of one embodiment of the byte reduction unit 46 of FIG. 10. An accumulator 60 receives the horizontal scaling factor 36 signal and a byte clock 61 signal. Accumulator 60 accumulates fractional values and only outputs integer values. An integer value generated by accumulator 60 selects a look-up table 62–65 corresponding to the desired number of output pixels for a single byte. The eight-bit byte on bus 56 is used to address a location in the selected look-up table 62–65. The desired output pixels are contained in the addressed location in the selected look-up table 62–65. The look-up table contents are initially created using the method of FIG. 1. The output pixels programmed into the look-up tables may be generated by a simple software program. Accessing values using look-up tables is characteristically fast. Therefore, this embodiment has even further speed advantages over the prior art. Since only bytes are processed, each look-up table need only contain 256 addresses. In applications where the scaling factor will not be below ½, only four or less look-up tables are needed.

The output pixels generated by the look-up tables may be buffered by a register 68 in order to form eight-bit bytes of pixel data.

Figure 12:
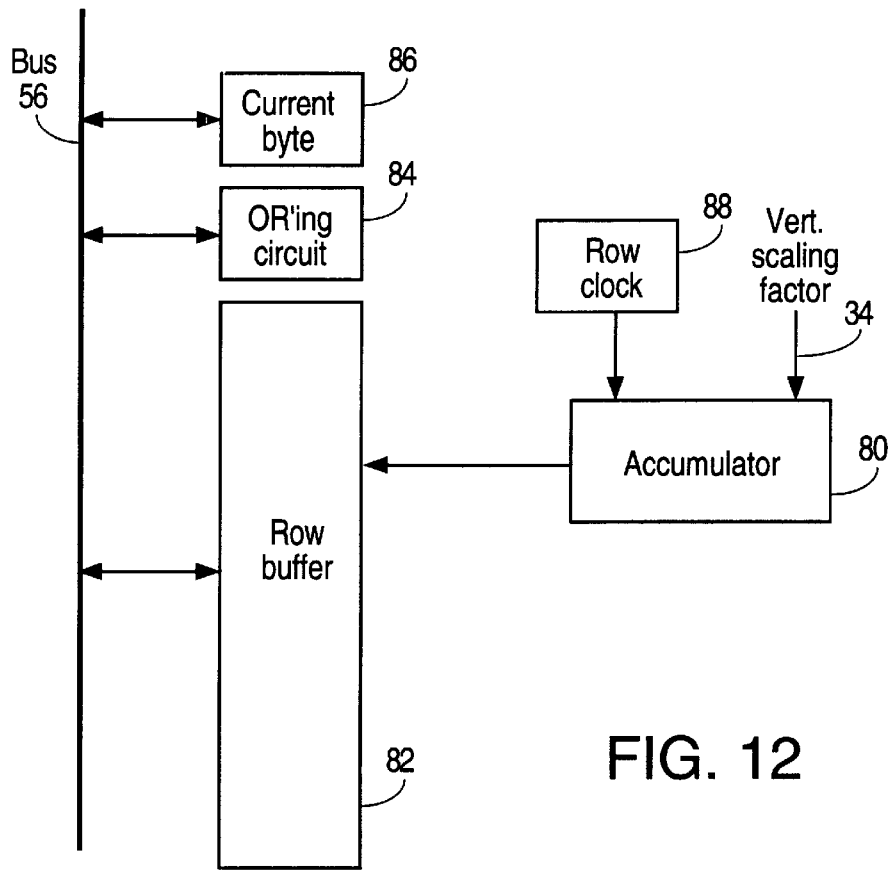
FIG. 12 is a block diagram of one embodiment of the byte ORing unit 48 in FIG. 10.

FIG. 12 is one embodiment of a circuit for performing the vertical OR'ing method of FIG. 6. An accumulator 80 identifies pixel rows to be deleted based on the vertical scaling factor 34. A row to be deleted is temporarily stored in a row buffer 82 (such as a FIFO buffer). As the bytes of the next row (which is not to be deleted) are received on bus 56, the incoming bytes are logically OR'd, by OR'ing circuit 84, with the corresponding byte in the buffer 82. This assumes that the bytes in the row to be deleted are determined to be part of text. A current byte buffer 86 is used, if required, to temporarily store the current byte during the OR'ing process. A row clock 88 provides clocking signals to accumulator 80.

Figure 13:
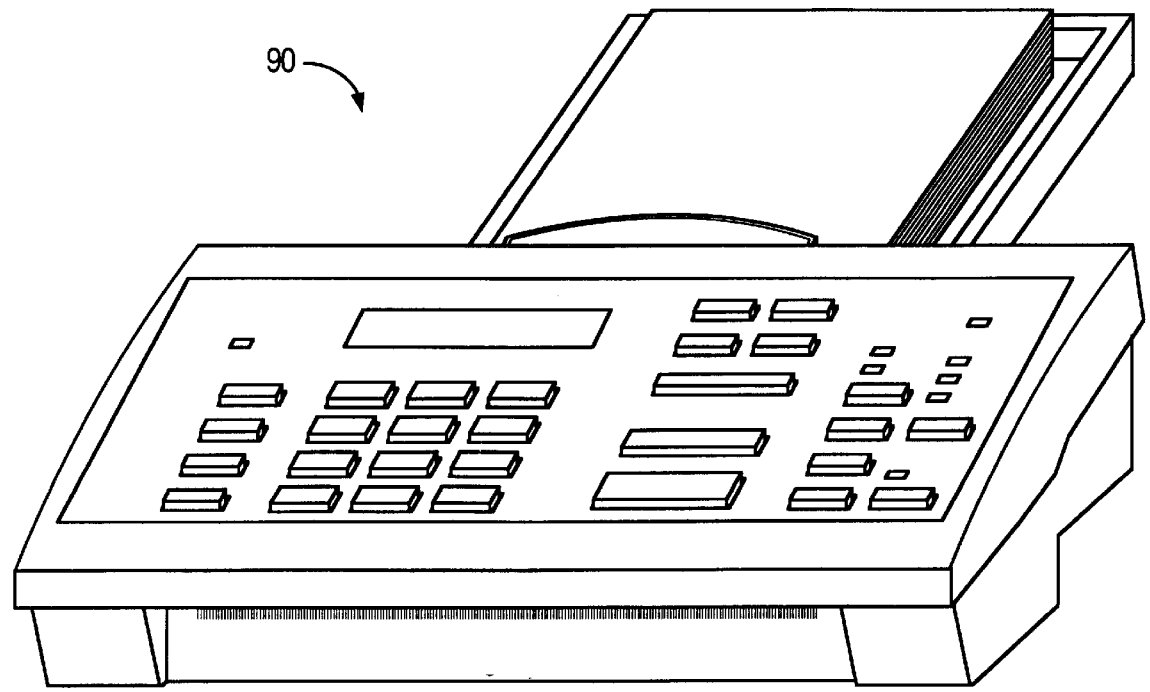
FIG. 13 illustrates a fax machine which incorporates the circuit of FIG. 10 for automatic horizontal and vertical scaling of a faxed image.

FIG. 13 illustrates a fax machine 90 which incorporates circuit 30 in FIG. 10. Using circuit 30, transmitted images which are too large to be printed by fax machine 90 or have too fine a resolution to be printed by fax machine 90 are automatically down-scaled to a size which can be completely printed by fax machine 90.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention. For example, instead of the disclosed circuitry operating on bytes, other numbers of bits (e.g., 16) may be operated on in groups.

What is claimed is:

1. A method for down scaling an original pixel pattern having horizontal rows of pixels and vertical columns of pixels, said method comprising the step of:
    horizontally scaling said pixel pattern, said step of horizontally scaling said pixel pattern comprising the steps of:
        determining a horizontal scale factor for reducing a length of said horizontal rows of pixels;
        receiving an original group of bits corresponding to a group of pixels in a row of pixels, a bit of a first logic level representing a dot to be displayed by a display device, a bit of a second logic level representing that a dot is not to be displayed;
        identifying bits to be deleted from said group of bits to achieve said horizontal scale factor;
        identifying which of said bits to be deleted meet a first criterion, said first criterion being that said bit to be deleted is of said first logic level bounded by bits of said second logic level, wherein bits immediately to either side of said group of bits along said row are presumed to be of said second logic level;
        setting a bit, within said group and adjacent to a bit to be deleted which met said first criterion, from said second logic level to said first logic level;
        deleting said bits to be deleted to reduce a size of said group of bits to achieve said horizontal scale factor; and
        outputting a horizontally scaled group of bits.

2. The method of claim 1 wherein said step of setting a bit from said second logic level to said first logic level comprises setting a bit to the right of said bit to be deleted which met said first criterion from said second logic level to said first logic level, said bit to the right representing a pixel to the right of a pixel to be deleted along said row.

3. The method of claim 1 wherein said group of bits comprises eight bits.

4. The method of claim 1 wherein said group of bits comprises 16 bits.

5. The method of claim 1 further comprising the steps of:
    determining whether said group of bits forms part of text or part of a picture; and
    only performing said step of setting if it is determined that said group of bits forms part of text.

6. The method of claim 5 wherein said step of determining whether said group of bits forms part of text or part of a picture comprises the steps of:
    determining whether said original group of bits meets a second criterion, said second criterion being if said group of bits contains two or fewer groups of one or more consecutive bits of said second logic level bounded by bits of said first logic level, wherein bits immediately to either side of said group of bits along said row are presumed to be of said second logic level; and
    if said group of bits meets said second criterion, determining that said group of bits forms part of text.

7. The method of claim 1 wherein said steps of identifying which of said bits to be deleted meet said first criterion and setting a bit from said second logic level to said first logic level are performed while programming one or more look-up tables, such that said one or more look-up tables contain addressable locations, each addressable location having an address corresponding to an original group of bits, and each addressable location containing said horizontally scaled group of bits corresponding to said original group of bits.

8. The method of claim 7 further comprising the steps of:
    selecting one of a plurality of said look-up tables which corresponds to a desired number of bits in said horizontally scaled group of bits;
    addressing a selected look-up table with said original group of bits; and
    outputting from said selected look-up table said horizontally scaled group of bits.

9. The method of claim 1 further comprising the step of vertically scaling said pixel pattern by deleting rows of pixels.

10. The method of claim 9 wherein said step of vertically scaling said pixel pattern is performed before said step of horizontally scaling said pixel pattern.

11. The method of claim 9 wherein said step of vertically scaling said pixel pattern comprises the steps of:
 determining a vertical scale factor for reducing a vertical height of said columns of pixels;
 receiving a first row of bits corresponding to a first row of pixels;
 identifying that said first row of pixels are to be deleted from said pixel pattern to achieve said vertical scale factor;
 receiving groups of bits in a second row of bits corresponding to a second row of pixels which are not to be deleted;
 logically OR'ing each bit in said first row of bits with each corresponding bit in said second row of bits to form an altered second row of bits;
 deleting said first row of bits; and
 outputting said altered second row of bits.

12. The method of claim 11 further comprising the steps of:
 receiving an electrical signal via a receiving facsimile machine corresponding to said pixel pattern;
 determining whether a received pixel pattern should be scaled down in either a vertical or a horizontal dimension in order to be fully printed by said receiving facsimile machine; and
 determining said horizontal scale factor and said vertical scale factor depending upon an amount of horizontal and vertical scaling needed to allow said pixel pattern to be completely printed by said receiving facsimile machine.

13. A method for down scaling an original pixel pattern having horizontal rows of pixels and vertical columns of pixels, said method comprising the steps of:
 vertically scaling said pixel pattern comprising the steps of:
  determining a vertical scale factor for reducing a vertical height of said columns of pixels;
  receiving a first row of bits corresponding to a first row of pixels, a bit of a first logic level representing a dot to be displayed by a display device, a bit of a second logic level representing that a dot is not to be displayed;
  identifying that said first row of pixels is to be deleted from said pixel pattern to achieve said vertical scale factor;
  receiving groups of bits in a second row of bits corresponding to a second row of pixels which are not to be deleted;
  determining whether a group of pixels represented by a group of said bits in said second row of bits contains characteristics of text;
  for all bits in a group corresponding to a group of pixels determined to have said characteristics of text, logically OR'ing each bit in said group of bits with each corresponding bit in said first row of bits to form an altered second row of bits;
  deleting said first row of bits; and
  outputting said altered second row of bits.

14. The method of claim 13 wherein said step of logically OR'ing is performed on one group of bits in said second row of bits at a time.

15. The method of claim 14 wherein said group of bits in said second row comprises eight bits.

16. The method of claim 13 wherein said step of determining whether said original pixel pattern contains characteristics of text or characteristics of a picture comprises the steps of:
 determining whether a group of bits in said first row to be deleted contains characteristics of text or characteristics of a picture; and
 if it is determined that said group of bits in said first row to be deleted contains characteristics of text, for all bits determined to have said characteristics of text, then performing said step of logically OR'ing on said group of bits.

17. The method of claim 13 wherein said step of determining whether said original pixel pattern contains characteristics of text or characteristics of a picture comprises the steps of:
 determining whether a group of bits in said second row contains characteristics of text or characteristics of a picture; and
 if it is determined that said group of bits in said second row contains characteristics of text, for all bits determined to have said characteristics of text, then performing said step of logically OR'ing on said group of bits.

18. The method of claim 13 further comprising the step of horizontally scaling said pixel pattern by reducing a number of pixels in each row of pixels.

19. The method of claim 18 wherein said step of logically OR'ing is performed prior to said step of horizontally scaling said pixel pattern.

20. A method for down scaling an original pixel pattern having horizontal rows of pixels and vertical columns of pixels, said method comprising the steps of:
 vertically scaling said pixel pattern comprising the steps of:
  determining a vertical scale factor for reducing a vertical height of said columns of pixels;
  receiving groups of bits in a first row of bits corresponding to a first row of pixels, a bit of a first logic level representing a dot to be displayed by a display device, a bit of a second logic level representing that a dot is not to be displayed;
  identifying that said first row of pixels is to be deleted from said pixels pattern to achieve said vertical scale factor;
  receiving groups of bits in a second row of bits corresponding to a second row of pixels which are not to be deleted;
  determining whether a group of bits is part of text or part of a picture comprising the steps of:
   detecting whether said group of bits meets a first criterion, said first criterion being that said group of bits has exactly one run of bits of said second logic level or exactly one run of bits of said first logic level, where a run of bits is defined as a group of consecutive bits of a same logic level bounded by bits of the other logic level, wherein bits immediately to either side of said group along said row are presumed to be of said first logic level;
   if said group of bits meets said first criterion, determining that said group of bits forms part of text;
   if it is determined that said group of bits is part of text, then logically OR'ing each bit in said first row of bits with each corresponding bit in said second row of bits to form an altered second row of bits;

deleting said first row of bits; and outputting said altered second row of bits.

21. The method of claim 17 further comprising the step of horizontally scaling said pixel pattern by reducing a number of pixels in each row of pixels.

22. A method for determining whether a group of bits is part of text or part of a picture, said method comprising the steps of:

receiving groups of bits in a row of bits corresponding to a row of pixels, a bit of a first logic level representing a dot to be displayed by a display device, a bit of a second logic level representing that a dot is not to be displayed;

for each group, detecting whether said group of bits meets a first criterion, said first criterion being that said group of bits has exactly one run of bits of said second logic level or exactly one run of bits of said first logic level, where a run of bits is defined as a group of consecutive bits of a same logic level bounded by bits of the other logic level, wherein bits immediately to either side of said group along said row are presumed to be of said first logic level; and if said group of bits meets said first criterion, determining that said group of bits forms part of text.

* * * * *